(12) United States Patent
Bruck et al.

(10) Patent No.: US 9,272,365 B2
(45) Date of Patent: Mar. 1, 2016

(54) SUPERALLOY LASER CLADDING WITH SURFACE TOPOLOGY ENERGY TRANSFER COMPENSATION

(75) Inventors: Gerald J. Bruck, Oviedo, FL (US);
Ahmed Kamel, Orlando, FL (US);
Brandon W. Shinn, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 521 days.

(21) Appl. No.: 13/611,034

(22) Filed: Sep. 12, 2012

(65) Prior Publication Data

US 2014/0072438 A1    Mar. 13, 2014

(51) Int. Cl.
*B23P 6/00* (2006.01)
*B23K 9/04* (2006.01)
(Continued)

(52) U.S. Cl.
CPC .............. *B23K 26/082* (2015.10); *B23K 26/342* (2015.10); *B23K 2201/001* (2013.01); *B23K 2203/08* (2013.01); *F01D 5/005* (2013.01); *F05D 2230/31* (2013.01); *F05D 2230/80* (2013.01); *Y10T 29/49316* (2015.01); *Y10T 29/49318* (2015.01); *Y10T 29/49718* (2015.01); *Y10T 29/49719* (2015.01); *Y10T 29/49721* (2015.01); *Y10T 29/49732* (2015.01); *Y10T 29/49737* (2015.01); *Y10T 29/49742* (2015.01); *Y10T 29/49746* (2015.01)

(58) Field of Classification Search
CPC ........... B23K 2201/001; B23K 26/032; B23K 26/0626; B23K 26/0807; B23K 26/0853; B23K 26/34; B23K 26/35; B23K 26/345; B23K 2203/08; Y10T 29/49216; Y10T 29/49318; Y10T 29/49718; Y10T 29/49719; Y10T 29/49721; Y10T 29/49732; Y10T 29/49737; Y10T 29/49742; Y10T 29/49746; Y10T 29/4974; F05D 2230/31; F05D 2230/80; F05D 5/005
USPC ............... 29/402.01, 402.09, 402.13, 402.16, 29/402.18, 889.1; 416/223 R, 241 R; 228/8–12, 102, 119, 262.3; 219/121.64, 121.61, 121.62, 121.8, 219/121.81, 121.83
See application file for complete search history.

(56) References Cited

U.S. PATENT DOCUMENTS

| | | |
|---|---|---|
| 4,625,095 A | 11/1986 | Das |
| 5,264,678 A | 11/1993 | Powell et al. |

(Continued)

FOREIGN PATENT DOCUMENTS

| | | |
|---|---|---|
| DE | 102007032190 | 1/2009 |
| DE | 102010060162 B3 | 12/2011 |

(Continued)

OTHER PUBLICATIONS

US 2011/0168002 A1, 07/2011, Clark et al. (withdrawn)

*Primary Examiner* — Moshe Wilensky
*Assistant Examiner* — Darrell C Ford (57) ABSTRACT

A superalloy substrate, such as a turbine blade or vane, is fabricated or repaired by laser beam welding to clad one or more layers on the substrate. Laser optical energy is transferred to the welding filler material and underlying substrate to assure filler melting and adequate substrate surface wetting for good fusion. Energy transfer is maintained below a level that jeopardizes substrate thermal degradation. Optical energy transfer to the filler and substrate is maintained uniformly as the laser beam and substrate are moved relative to each other along a translation path by varying the energy transfer rate to compensate for localized substrate topology variations.

9 Claims, 5 Drawing Sheets

(51) Int. Cl.
  *B23K 26/00*  (2014.01)
  *B23K 26/04*  (2014.01)
  *B23K 26/08*  (2014.01)
  *B23K 26/02*  (2014.01)
  *F01D 5/00*  (2006.01)

(56) References Cited

U.S. PATENT DOCUMENTS

| | | | |
|---|---|---|---|
| 5,504,303 A | 4/1996 | Nagy | |
| 5,552,575 A * | 9/1996 | Doumanidis | 219/124.34 |
| 5,648,127 A * | 7/1997 | Turchan | C23C 14/0605 117/103 |
| 5,660,669 A | 8/1997 | Mittleider | |
| 5,993,554 A | 11/1999 | Keicher et al. | |
| 6,188,041 B1 | 2/2001 | Kim et al. | |
| 6,694,207 B2 * | 2/2004 | Darrah et al. | 700/119 |
| 6,889,889 B2 * | 5/2005 | Offer | B23K 9/0061 228/119 |
| 8,387,853 B2 * | 3/2013 | Tuppen et al. | 228/119 |
| 8,497,450 B2 * | 7/2013 | Bruland et al. | 219/121.69 |
| 2003/0217993 A1 * | 11/2003 | Stol et al. | 219/121.64 |
| 2004/0133298 A1 * | 7/2004 | Toyserkani | B23K 26/032 700/166 |
| 2004/0173585 A1 * | 9/2004 | Talwar et al. | 219/121.63 |
| 2004/0238508 A1 * | 12/2004 | Rabinovich | B23P 6/005 219/121.85 |
| 2004/0251242 A1 | 12/2004 | Suh | |
| 2005/0178750 A1 * | 8/2005 | Cheng et al. | 219/121.64 |
| 2006/0049153 A1 | 3/2006 | Cahoon et al. | |
| 2006/0102601 A1 | 5/2006 | Shirk et al. | |
| 2006/0283705 A1 * | 12/2006 | Tanase et al. | 204/298.12 |
| 2007/0023403 A1 * | 2/2007 | Emiljanow | 219/121.64 |
| 2008/0029495 A1 | 2/2008 | Emiljanow et al. | |
| 2009/0280269 A1 | 11/2009 | Bewlay et al. | |
| 2010/0034647 A1 | 2/2010 | Lee et al. | |
| 2010/0078411 A1 | 4/2010 | Hughes et al. | |
| 2010/0326969 A1 | 12/2010 | Tsukamoto | |
| 2011/0056919 A1 * | 3/2011 | Burbaum et al. | 219/121.64 |
| 2011/0089151 A1 | 4/2011 | Miyagi et al. | |
| 2011/0240607 A1 * | 10/2011 | Stecker et al. | 219/121.17 |
| 2011/0297658 A1 * | 12/2011 | Peters et al. | 219/162 |
| 2012/0145771 A1 | 6/2012 | Bohlin | |
| 2012/0156020 A1 * | 6/2012 | Kottilingam et al. | 415/200 |
| 2012/0199564 A1 | 8/2012 | Washko, Jr. | |
| 2014/0069893 A1 | 3/2014 | Bruck et al. | |
| 2014/0251533 A1 * | 9/2014 | Lim | B23K 26/0626 156/247 |
| 2015/0048058 A1 | 2/2015 | Bruck et al. | |
| 2015/0048064 A1 * | 2/2015 | Cheverton et al. | 219/121.63 |
| 2015/0083692 A1 | 3/2015 | Bruck | |
| 2015/0224607 A1 * | 8/2015 | Bruck | B23K 35/36 219/73.21 |
| 2015/0246848 A1 * | 9/2015 | Ikenoue | C03C 23/0025 65/112 |
| 2015/0251274 A1 * | 9/2015 | Hanschmann | B23K 26/3206 403/272 |

FOREIGN PATENT DOCUMENTS

| | | |
|---|---|---|
| EP | 0555896 | 8/1993 |
| EP | 2343148 | 7/2011 |
| EP | 2395199 A2 | 12/2011 |
| GB | 2378150 A | 2/2003 |
| GB | 2453043 A | 4/2009 |
| JP | 2007029977 | 2/2007 |
| JP | 201000534 | 1/2010 |
| WO | 03042895 | 5/2003 |
| WO | 2004039531 | 5/2004 |
| WO | 2012109086 | 8/2012 |

\* cited by examiner

SUPERALLOY LASER CLADDING WITH SURFACE TOPOLOGY ENERGY TRANSFER COMPENSATION

CROSS-REFERENCE TO RELATED APPLICATIONS

This application incorporates by reference commonly owned, co-pending United States utility patent application entitled "LASER CLADDING SYSTEM FILLER MATERIAL DISTRIBUTION APPARATUS", filed Sep. 12, 2012, and assigned Ser. No. 13/611,144, which is incorporated by reference herein.

BACKGROUND OF THE DISCLOSURE

1. Field of the Invention

The invention relates to methods for cladding superalloy components, such as service-degraded turbine blades and vanes, by laser beam welding. More particularly, the present invention methods weld one or more filler material layers to substrates along weld translation paths and regulate laser optical energy to compensate for localized substrate topology variations, facilitating uniform or deliberately modified energy transfer rates along the paths.

2. Description of the Prior Art

"Structural" repair of gas turbine or other superalloy components is commonly recognized as replacing damaged material with matching alloy material and achieving properties, such as strength, that are close to the original manufacture component specifications (e.g., at least seventy percent ultimate tensile strength of the original specification). For example, it is preferable to perform structural repairs on turbine blades that have experienced surface cracks, so that risk of further cracking is reduced, and the blades are restored to original material structural and dimensional specifications.

Repair of nickel and cobalt based superalloy material that is used to manufacture turbine components, such as turbine blades, is challenging, due to the metallurgic properties of the finished blade material. The finished turbine blade alloys are typically strengthened during post casting heat treatments, which render them difficult to perform subsequent structural welding. For example a superalloy having more than 6% aggregate aluminum or titanium content, such as CM247 ® superalloy, is more susceptible to strain age cracking when subjected to high-temperature welding than a lower aluminum-titanium content superalloy, such as X-750 ® superalloy.

Currently used welding processes for superalloy fabrication or repair generally involve substantial melting of the substrate adjoining the weld preparation, and complete melting of the welding rod or other filler material added. When a blade constructed of such a material is welded with filler metal of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

One known superalloy joining and repair method that attempts to melt superalloy filler material without thermally degrading the underlying superalloy substrate is laser beam welding, also known as laser beam micro cladding. Superalloy filler material (often powdered filler) compatible with or identical to the superalloy substrate material is pre-positioned on a substrate surface or sprayed on the surface during the cladding process. A "spot" area of focused laser optical energy generated by a fixed-optic laser (i.e., other than relative translation, laser and substrate have a fixed relative orientation during laser beam application) liquefies the filler material and heats the substrate surface sufficiently to facilitate good coalescence of the filler and substrate material, that subsequently solidify as a clad deposit layer on the substrate surface. Compared to other known traditional welding processes, laser beam micro-cladding is a lower heat input process, with relatively good control over melting of the substrate and rapid solidification that reduce propensity to cause previously-described solidification cracking. Lower heat input to the superalloy substrate during laser welding/cladding also minimizes residual stresses that otherwise would be susceptible to previously described post-weld heat treatment strain age cracking. While laser cladding welds have structural advantages over traditionally-formed welds, practical manufacturing and repair realities require larger cladding surface area and/or volume coverage than can be filled by any single pass applied cladding deposit.

Figure 1:
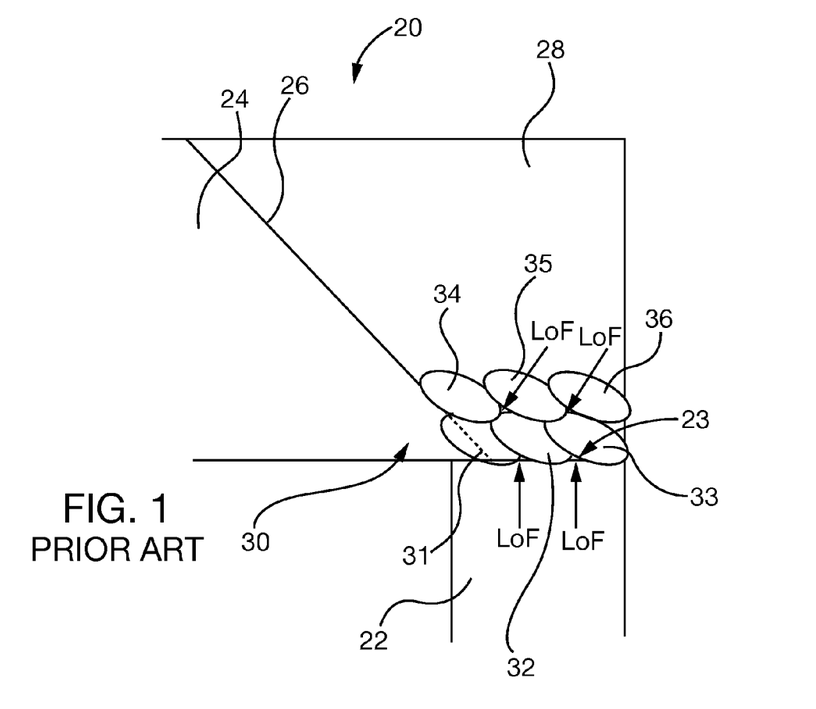
FIG. 1 shows a schematic sectional elevational view of a turbine blade repaired by known laser beam welding techniques.

To meet needs for adding volume to superalloy components, a laser-cladded deposit on a substrate can be formed from single- or two-dimensional arrays of adjoining solidified clad passes. Multiple laser-welded cladding passes and layers can be applied to build surface dimensional volume. Creating arrays of laser-clad deposits often results in microcracks and defects in the deposited material and underlying substrate in the heat affected zone material. Some defects are related to lack of fusion (LoF) that is common when there is insufficient localized laser optical energy heat input. As shown in FIG. 1, exemplary superalloy turbine blade 20 has a blade body 22. Original integrally-cast tip cap and squealer (not shown) are often damaged and eroded in service and require remnant cleanup removal to achieve a rework plane 23 at top of body 22. New separate tip cap 24 is machined from new matching cast material and placed on rework plane 23. The blade 20 then requires structural repair filling of the missing portion 28 along and to the right of the tip cap side 26 with a volume of superalloy filler, in order to restore the original structural dimensions of the tip cap and to fuse to both the tip cap side 26 and blade body 22 over rework plane 23. A two-dimensional filler weld array 30 of individually-applied laser clad deposits or passes 31-36 is formed by known laser cladding methods. The laser beam focus position and substrate surface are moved relative to each other after a single deposit (e.g., 31, etc.), formation to weld the next deposit (e.g., 32, etc.).

As noted in FIG. 1, the weld array 30 exhibits lack of fusion (LoF) at corners of every weld pass. The LoF is caused by combinations of one or more of localized variations in the blade 20' substrate surface topology that require corresponding variations in laser optical energy transfer in order to maintain desired fusion, including: asymmetric heat sink properties; diminished power density; and surface reflectivity. Local surface topology 40 variations are shown schematically in FIG. 2. A previously applied solidified laser-clad deposit 50 has a curved surface 53 that is bounded by a high point 52 and an edge 54. The edge 54 is in contact with the substrate surface 42. The deposit 50 represents additional heat sink material that must be heated along with underlying substrate 40 when the next laser-clad deposit is formed in abutting relationship to create a continuous weld line. Additionally, the curved surface 53 spreads the laser beam energy transfer of the next adjoining deposit and reduces localized power density (e.g., watts) per unit area. Potentially the curved surface 53 also changes localized laser optical reflectivity, which may be compounded by non-uniform filler powder distribution, e.g., scattering away from the curved surface, adding additional reflectivity variance.

Figure 2:
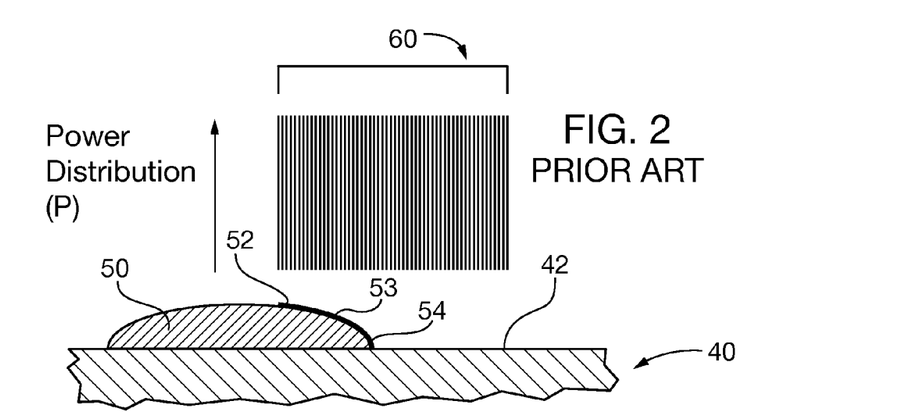
FIG. 2 shows an schematic enlarged cross sectional view of a single weld pass of a turbine blade repaired by known laser beam welding techniques.

When the next laser cladding deposit 60 is applied in adjoining, overlapping relationship with existing deposit 50, a common uniformly applied power and/or filler powder distribution across the new laser focus zone would not apply sufficient localized fusion energy, causing a poorer than desired weld in the curved surface 53 portion within the overlapping region. An overall uniform increase in applied heat energy by the laser when forming deposit 60, in order to compensate for "worst case" lack of fusion in the curved surface portion 53 of the overlapping region, is more than required for good fusion of the substrate 40 to the right of the prior deposit edge 54. This results in over-melting, overheating and over-stressing of the crack sensitive substrate material 40, which may unnecessarily instigate subsequent hot cracking and/or strain age cracking.

It is often desirable to build superalloy material dimensional volume in a newly fabricated or repaired service-degraded superalloy component, such as a turbine blade or vane. When known laser cladding methods are employed multiple pass layers are applied over previously deposited multiple pass layers to create the needed built up volume. Laser microcladding with fixed optics requires multiple passes to accomplish a typical repair buildup because the size of overall area to be repaired is large relative to the beam diameter at focus. Each pass overlap involves a challenge in ensuring that full fusion is achieved within each built-up layer and that full fusion is achieved with the previously-applied underlying layer. Typically in known fixed optic laser cladding processes weld solidification crystal alignment tends to shift from perpendicular to the substrate in the first few applied layers and then tends to shift at an increasingly skewed angle in subsequently applied clad layers. Microcracking often initiates upon such shifts in the inter-layer crystallographic orientation.

Thus, a need exists in the art for a laser welding method for cladding superalloy components, such as turbine vanes and blades, which facilities uniform welds with desired localized fusion along a translation path without degrading structural properties of the component substrate.

A need also exists in the art for a laser welding method for cladding multiple layers to superalloy components, such as turbine vanes and blades, that facilities formation of continuous welds along a translation path with desired localized fusion within each applied layer without degrading structural properties of the component substrate.

Another need exists in the art for a laser welding method for cladding superalloy components, such as turbine vanes and blades, that facilities uniform welds in multiple dimensions and/or layers with desired localized fusion within an applied layer without degrading structural properties of the component substrate or underlying previously applied cladding layers.

Yet another need exists in the art for a laser welding method for building up surfaces of superalloy components, such as turbine vanes and blades, by application of multiple laser cladding layers, that maintains epitaxial grain growth from the substrate through each successive layer, in order to reduce likelihood of microcracking that might otherwise occur with changes in clad inter-layer crystallographic orientation.

SUMMARY OF THE INVENTION

Accordingly, an object of the invention is to create a laser welding method for cladding superalloy components, such as turbine vanes and blades that facilities uniform welds with desired localized fusion along a translation path without degrading structural properties of the component substrate.

It is also an object of the present invention to create a laser welding method for cladding multiple layers to superalloy components, such as turbine vanes and blades, that facilities formation of continuous welds along a translation path with desired localized fusion within each applied layer without degrading structural properties of the component substrate.

Another object of the present invention is to create a laser welding method for cladding superalloy components, such as turbine vanes and blades, that facilities uniform welds in multiple dimensions and/or layers with desired localized fusion within an applied layer without degrading structural properties of the component substrate or underlying previously applied cladding layers.

Yet another object of the present invention is to create a laser welding method for building up surfaces of superalloy components, such as turbine vanes and blades, by application of multiple laser cladding layers, that maintains epitaxial grain growth from the substrate through each successive layer, in order to reduce likelihood of microcracking that might otherwise occur with changes in clad inter-layer crystallographic orientation.

These and other objects are achieved in accordance with the present invention by laser beam welding of superalloy substrates, such as a turbine blades or vanes, to clad one or more layers on the substrate for structurally building up surface area and/or volume with superalloy filler material. Sufficient laser optical energy is transferred to the welding filler material and underlying substrate to assure filler melting and adequate substrate surface wetting for good fusion. However, energy transfer is maintained below a level that jeopardizes substrate thermal degradation. Optical energy transfer to the filler and substrate is maintained uniformly as the laser beam and substrate are moved relative to each other along a translation path by varying the energy transfer rate to compensate for localized substrate topology variations. In this way a continuous weld cladding layer is formed of uniform consistency.

Embodiments of the present invention feature a method for cladding superalloy components by introducing filler material on a component superalloy substrate surface and focusing a laser beam on the filler material and substrate. Optical energy is transferred from the laser to the filler material and substrate, which fuses the filler material to the substrate as a filler layer without causing thermal degradation to the substrate. The substrate and laser beam are moved relative to each other while maintaining uniform energy transfer.

Other embodiments of the present invention feature turbine blade and vane components respectively having a superalloy substrate and a multi-layer cladding that maintains epitaxial grain growth from the substrate through each successive layer by the process of: introducing filler material on superalloy substrate surface; focusing a laser beam on the filler material and substrate; transferring optical energy with the laser to the filler material and substrate that fuses the filler material to the substrate as a filler layer without causing thermal degradation to the substrate; and moving the substrate and laser beam relative to each other while maintaining uniform energy transfer.

Embodiments of the present invention also feature a system for cladding turbine superalloy components with a filler layer. The system has a laser generating a laser beam for transferring optical energy to a turbine component superalloy substrate and filler material on the substrate, which fuses the filler material to the substrate as a filler layer without causing thermal degradation to the substrate. A movable mirror intercepts the laser beam, for orienting the laser beam on the substrate. A drive system is coupled to the movable mirror and/or substrate for causing relative motion between the laser beam and substrate, and for maintaining uniform energy transfer to the substrate.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in repair of superalloy components, such as turbine blades and vanes, by a laser beam welding method that promotes bonding of the superalloy substrate to one or more cladding layers without substrate thermal degradation. The present invention laser cladding methods vary laser optical energy transfer rate to compensate for localized substrate topology variations, so that the energy transfer to the filler and substrate remains uniform during a welding pass.

Sufficient laser optical energy is transferred to the welding filler material and underlying substrate to assure filler melting and adequate substrate surface wetting for good fusion. However, energy transfer is maintained below a level that jeopardizes substrate thermal degradation. Optical energy transfer to the filler and substrate is maintained uniformly as the laser beam and substrate are moved relative to each other along a welding pass translation path by varying the energy transfer rate to compensate for localized substrate topology variations. For example, the optical energy transfer rate is increased for relatively more reflective or curved zones that do not absorb the laser's optical energy as efficiently as relatively non-reflective or flat zones. Energy transfer rate can be varied, for example by oscillating the laser beam transverse to the translation movement path, varying its movement and/or oscillation velocity, changing laser beam focus to narrower or wider beam, or changing the laser beam power output. The laser beam may be rastered in one-, two- or three dimensions to build a continuous cladding layer.

When multiple cladding layers are applied on each other, using the methods of the present invention, uniaxial crystallographic orientation generally perpendicular to the substrate is maintained in the clad buildup. Uniaxial orientation reduces likelihood of microcracking that often occurs when cladding multiple multipass layers using known fixed optic laser welding techniques.

Figure 3:
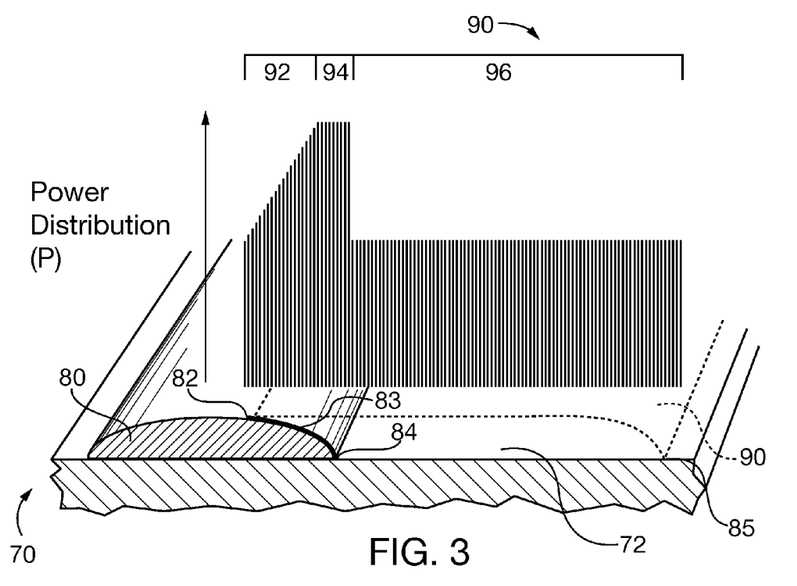
FIG. 3 shows a schematic enlarged cross sectional view of a turbine blade repaired by the laser beam welding method of the present invention.

With reference to FIG. 3, when practicing an embodiment of the present invention substrate 70 has a previously applied laser clad deposit 80, (shown in cross section) with a curved surface 83 on its side bounded by the high point 82 and the edge 84. In order to create a continuous cladding layer next to deposit 80 and on substrate 70, the next laser cladding pass 90 is intended to overlap the prior deposit 80 at high point 82 extending in width to point 85 and progress into the plane of this figure. The laser focus spot is rapidly oscillated from 82 to, e.g., 85 to create a line source of energy. Progression of this line source of energy into/out of the plane of this figure relative to substrate 70 produces a clad deposit 90 adjacent to existing deposit 80. Laser optical energy transfer rate will be varied along the beam oscillation path (here left to right in the figure) to compensate for variations in the substrate 70, so that sufficient energy is transferred to achieve good filler material fusion without overheating the underlying substrate. To compensate for the curved surface 83 of the previous deposit 80 the laser optical energy transfer rate is ramped up in the overlapping portion 92 of the new cladding layer laser pass, reaching a plateau power spike 94 at the transition corner between the deposit 80 edge 84 and the bare surface 72 of substrate 70. The optical energy transfer rate is lowered when the laser beam is directed at the flat, bare substrate surface 72 of the substrate 70, maintaining a uniform optical energy transfer 96 across the cladding weld pass, despite localized variations in surface topology.

Laser optical energy transfer rate can be varied to compensate for asymmetric surface topology while the laser beam focus spot and substrate 70 are moved relative to each other, by tailoring the rastering pattern across the oscillation path to change applied power density and filler material/substrate absorbed energy. Laser optical energy absorbed at any beam focus area varies proportionately with focus time duration. By non-limiting example focus laser beam focus time duration and proportional absorbed energy can be varied in the following ways: (i) the laser beam can be oscillated parallel to or side-to-side transverse the weld translation path; (ii) the translation speed or velocity can be varied; and (iii) the laser power intensity can be varied continuously or by pulse modulation.

Figure 4:
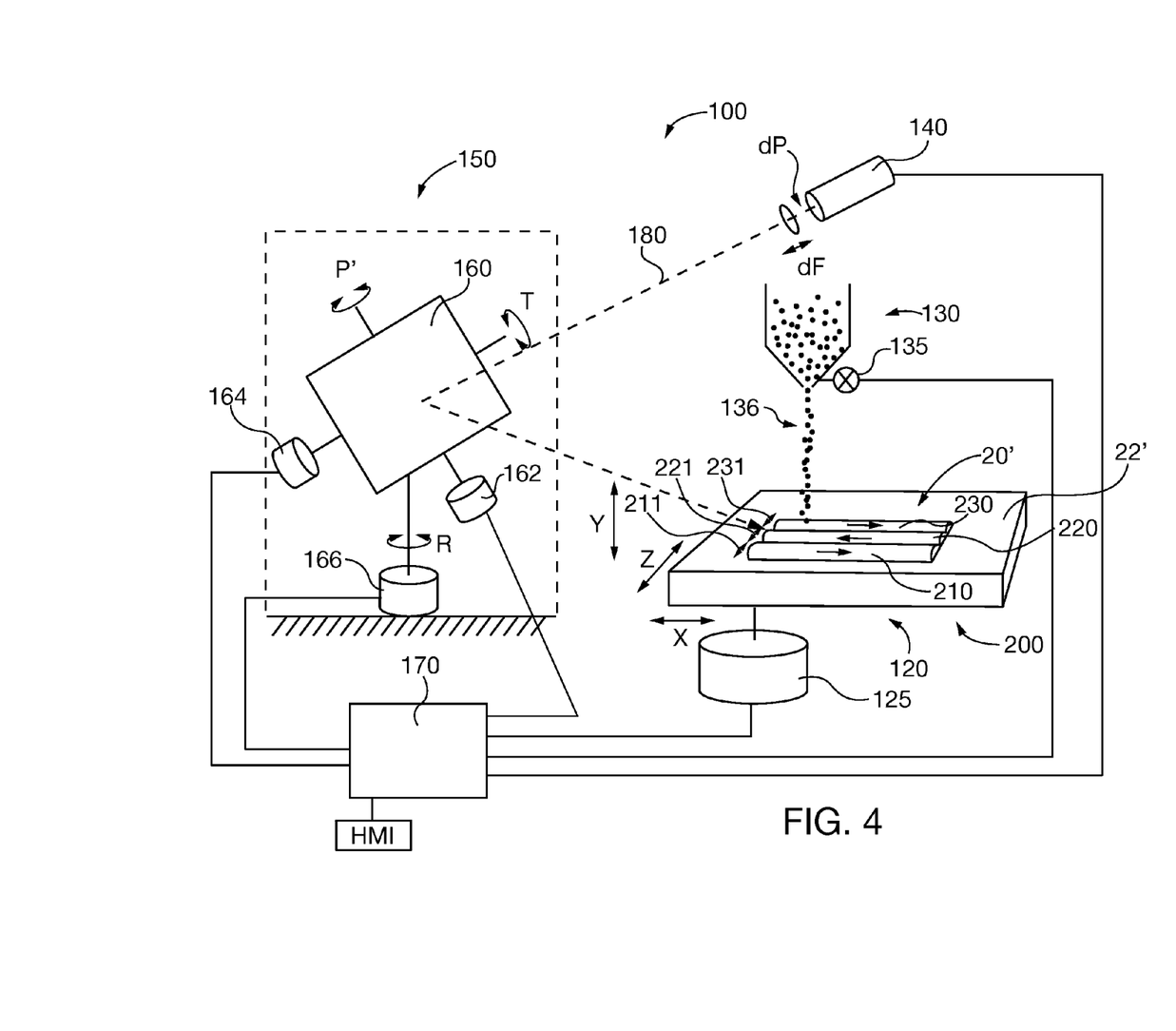
FIG. 4 is a schematic view of a laser beam welding system of the present invention.

FIG. 4 shows an embodiment of a laser welding/cladding system 100 of the present invention. The cladding system 100 includes a work table 120 to which is affixed a work piece such as turbine blade 20'. Optional work table motion control system 125 is used to move the work table 120 in the X, Y and Z coordinates shown or in any other single- or multi-axis coordinate system. A known powdered filler hopper 130 with application valve 135 introduces powdered filler material to the turbine blade 20' substrate surfaces 22'. The powder filler may have its own independent motion control system for moving the poured powder 136 application zones relative to the blade 20' substrate. Powdered filler material may be fed to the fixed point of beam focus, as shown, off-axis powder feeders can spray filler powder over the full translational range of laser beam scanning, and elongated powder feeder nozzles can be employed. Powder may also be pre-placed on the substrate surface 22' before the laser welding process is initiated. Solid wire or strip filler may be substituted for powder filler material.

The system 100 has a laser 140 with optional variable focus dF or power output dP that provides the laser beam optical energy source for heating the substrate 20 and filler material 136. The system 100 also has a moveable mirror system 150 with mirror 160 that is capable of single- or multi-axis movement, shown as tilt T, pan P and rotate R axes under control of respective drives 162, 164 and 166. The drives 162, 164 and 166 may be part of a known construction motorized motion control system or incorporated in a known galvanometer, that are under control of known controller 170. Alternately the beam may be intercepted by multiple mirrors with single (or multiple) axes of motion to achieve each of the afore-described axes movements.

The controller 170 may be a stand-alone controller, programmable logic controller or personal computer. The controller 170 may also control one or more of the work table motion control system 125, the powdered filler material hopper 130 application valve 135 and/or the optional hopper motion control system (not shown), and/or the laser 140 variable focus dF and/or power output dP. Known open and/or closed feedback loops with the controller 170 may be associated with one or more of the drives for the motion control system 125, the application valve 135, the mirror axes 162-166, dF, dP, and the hopper position drive. Laser beam optical energy transfer to the substrate and filler can also be monitored in a closed feedback loop so that the controller can vary the energy transfer rate based on the monitored energy transfer rate. A human machine interface (HMI) may be coupled to the controller 170 for monitoring welding operations and/or providing instructions for performing a welding operation.

When operating the welding system 100 of FIG. 4, the output beam 180 of the laser 140 is reflected off mirror 160 (or multiple mirrors) and in turn on to the turbine blade 20' work piece, which transfers optical energy to the turbine blade 20' and filler material 136. Both the turbine blade substrate 20' and filler material 136 absorb the transferred optical energy, to melt the filler material, wet the substrate surface and fuse the melted filler and substrate surface to each other. The substrate 20' and laser beam 180 are moved relative to each other along a translation path by the control system engagement of the work table drive system 125 and/or the moveable mirror system 150 drives 162, 164, 166 to form a continuous welded cladding layer 200. When the movable mirror system 150 is incorporated in a commercially available laser galvanometer system, relative motion between the substrate 20' and the laser beam 180 as well as the laser optical energy transfer rate can be varied by moving the galvanometer mirror 160 (or multiple mirrors) for both relative translation and oscillation. Relative motion between the laser beam 180 and the substrate 20'/filler material 136 maintains a continuous melted weld line at the leading edge of translation motion (e.g., the right leading edge of the weld line in FIG. 4) for fusion uniformity that is not possible with known unoscillated laser cladding systems.

As previously noted the laser optical energy absorbed at any beam focus area varies proportionately with focus time duration. By non-limiting example laser beam 180 focus time duration and proportional absorbed energy can be varied in the following ways: (i) the laser beam 180 can be oscillated parallel to or side-to-side transverse (e.g., 211) the weld translation path 210; (ii) the oscillation or translation speed can be varied; and (iii) the laser power intensity dP or focus dF can be varied continuously or by pulse modulation. Thus by dynamically varying changing the rate of laser beam focus time duration the energy transfer rate to the substrate and filler is varied along the weld line translation path, so that uniform energy transfer is maintained within the entire weld, regardless of local topography variations.

Figure 5:
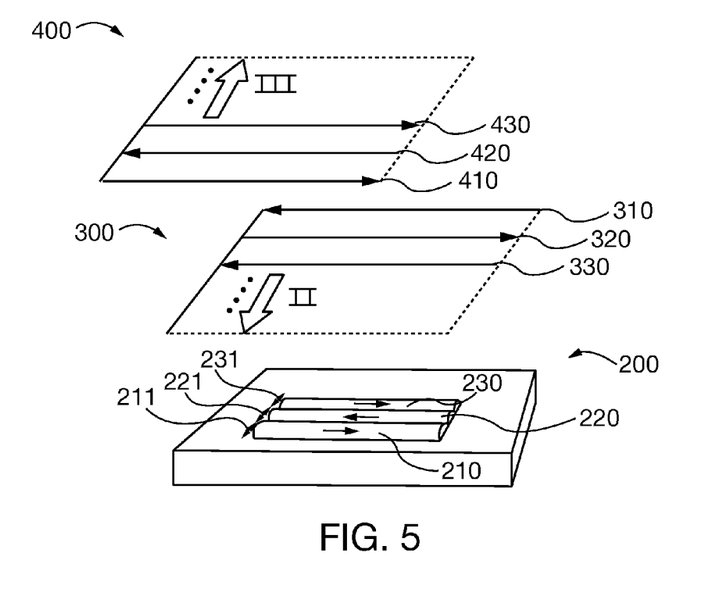
FIG. 5 is a schematic view of a multi-layer laser weld rastering pattern of the present invention, for restoring a service-degraded damaged turbine blade substrate.
Figure 6:
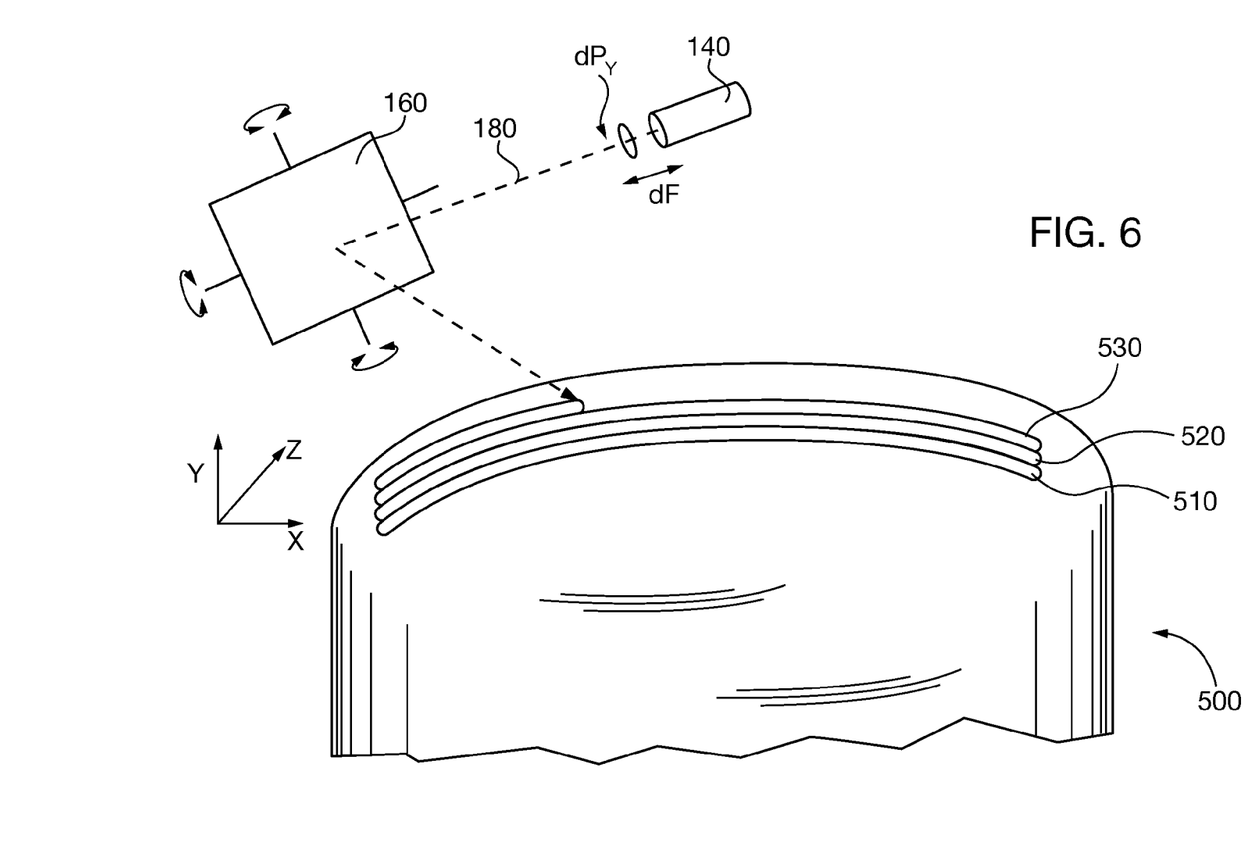
FIG. 6 is a schematic view of a three-dimensional laser weld rastering pattern of the present invention, for restoring a service-degraded damaged turbine blade substrate.

As shown in FIGS. 4 and 5, a cladding layer may comprise a single raster linear weld 210 or a two-dimensional weld array of multiple adjoining linear welds 210-230. Translation directions for each pass may be sequentially reversed as shown. Oscillation directions for each pass may be purely transverse to the translation direction as 211, 221 and 231 for each pass 210, 220 and 230 respectively. Duration of oscillation against the side of previous passes may be increased to ensure fusion. Multiple cladding layers 200, 300, 400 may be applied on each other by sequentially alternating layers in directions in and out of FIG. 5, or even changing directions of translation to other than left to right e.g. to 90 degrees from left to right. Alternatively, as shown in FIG. 6, three-dimensional welding may be performed on a curved substrate 500 in single pass or multi-pass layers 510/520/530 by varying laser 140 focus dF and/or laser power dP to compensate for changes in optical energy transfer caused by varying distance between the substrate 500 surface and the mirror 160.

Figure 7:
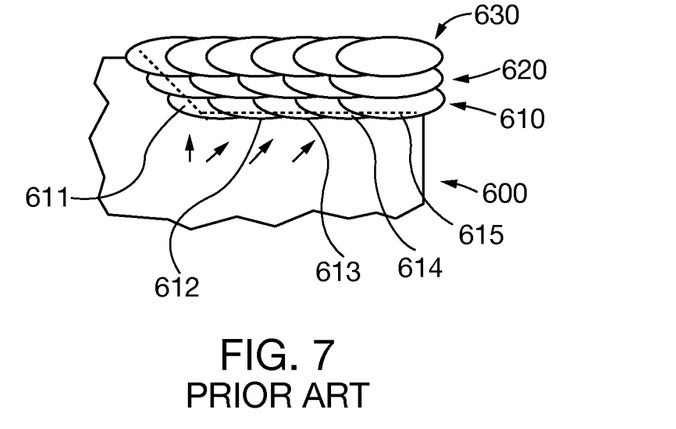
FIGS. 7 and 8 shows respectively known prior art and present invention multi-layer laser weld deposition patterns for restoring a service-degraded damaged turbine blade substrate.
Figure 8:
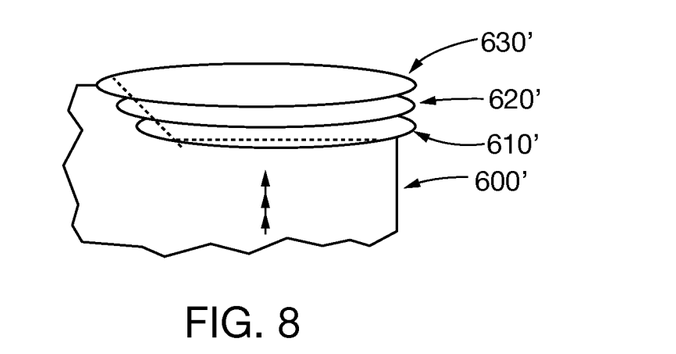

Multi-layer cladding using the methods of the present invention advantageously maintains epitaxial grain growth from the substrate through each successive layer, in order to reduce likelihood of microcracking that might otherwise occur with changes in clad inter-layer crystallographic orientation. As previously noted, laser microcladding with known fixed optics systems requires multiple passes 600 to accomplish a typical repair buildup, as shown in FIG. 7. Typically in known fixed (unoscillated) optic laser cladding processes weld solidification crystal alignment tends to shift in the first few layers (e.g., 610) from perpendicular to the substrate in the first few applied deposits 611, 612 then tends to shift at an increasingly skewed angle in subsequently applied deposits 613, 614, 615, etc. Greater shifting occurs in subsequently clad layers, 620, 630, etc. Microcracking often initiates upon such shifts in the inter-layer crystallographic orientation. In contrast to the known unoscillated focus laser cladding methods, the methods of the present invention, shown in FIG. 8 forms a multi-clad layer 600', such as by the continuous rastered pattern shown in FIG. 5. The single pass layers 610', 620', 630', etc., promote nearly uni-axial epitaxial grain growth within the cladding layers because the grain crystal structure solidifies perpendicular to the substrate surface. Properties of single crystal or directionally solidified substrates may also be maintained by the cladding methods of the present invention.

Advantages of the laser cladding methods and system of the present invention over previously known unoscillated optic laser cladding methods include reduction in non-fusion defects, due to the single pass layers with compensation for substrate topology asymmetries that provides complete filler melt and bonding to the substrate. Fusion is provided without overheating and overstressing of solidification and strain age crack sensitive superalloy materials. The uniaxial solidification is made possible by rastering the laser beam that maintains epitaxial grain growth from the substrate and minimizes or eliminates microcracking. Uniaxial solidification is also enhanced by alternating translation direction from layer to layer. Properties of single crystal or directionally solidified substrates may also be maintained by such processing.

Although various embodiments, which incorporate the teachings of the present invention, have been shown and described in detail herein, those skilled in the art can readily devise many other varied embodiments that still incorporate these teachings.

What is claimed is:

1. A method for multi-layer cladding of epitaxial grain superalloy components, that maintains epitaxial grain growth in newly clad layers, comprising:

introducing filler material on a component superalloy substrate surface;

focusing a laser beam on the filler material and substrate;

transferring optical energy at a selected optical energy transfer level from the laser to the filler material and substrate that fuses the filler material to the substrate as a filler layer without causing thermal degradation to the substrate;

moving the substrate and laser beam relative to each other, fusing the filler material to the substrate along a first deposit path, in a first cladding layer and first path direction on the substrate surface, and varying optical energy transfer rate, compensating for changes in component surface topology, while maintaining uniform energy transfer at the selected optical energy transfer level;

forming an adjoining first cladding layer second deposit path on the substrate surface, which overlaps the first deposit path, by moving the laser beam and substrate relative to each other in a second path direction that is opposite the first path direction, and increasing energy transfer rate during the second deposit path formation in an overlapping first and second deposit path region, while maintaining uniform energy transfer at the selected optical energy transfer level;

forming a second cladding layer third deposit path, overlying the first cladding layer second deposit path, by moving the laser beam and substrate relative to each other in a third path direction that is generally opposite the second path direction, and varying optical energy transfer rate, compensating for changes in component surface topology, while maintaining uniform energy transfer at the selected optical energy transfer level; and forming an adjoining second cladding layer fourth deposit path, overlying the first cladding layer first deposit path, which overlaps the third deposit path, by moving the laser beam and substrate relative to each other in a fourth path direction, which is opposite the first and third path directions, and increasing energy transfer rate during the fourth deposit path formation in an overlapping third and fourth deposit path region, while maintaining uniform energy transfer at the selected optical energy transfer level;

such that weld solidification crystal alignment in the deposited cladding layers is generally perpendicular to the substrate surface from the substrate and through each successive clad layer.

2. The method of claim 1, further comprising sequentially forming additional alternating first and second deposit paths in a first cladding layer pattern, advancing said first layer pattern across the substrate surface in first layer advancement direction that is generally perpendicular to the first and second deposit path directions, while maintaining uniform energy transfer at the selected optical energy transfer level.

3. The method of claim 2, further comprising sequentially forming additional alternating third and fourth deposit paths in the second cladding layer pattern, advancing said second layer across the substrate surface in a second layer advancement direction that is generally perpendicular to the third and fourth deposit path directions and opposite the first layer pattern advancement direction, while maintaining uniform energy transfer at the selected optical energy transfer level, such that weld solidification crystal alignment in the deposited cladding layer patterns is generally perpendicular to the substrate surface from the substrate and through each successive clad layer pattern.

4. The method of claim 3, further comprising sequentially forming additional overlying cladding layers on the substrate surface by forming a third cladding layer pattern over the second cladding layer, the third cladding layer pattern repeating the first cladding layer pattern, and the fourth cladding layer pattern repeating the second cladding layer pattern, such that weld solidification crystal alignment in the deposited cladding layer patterns is generally perpendicular to the substrate surface from the substrate and through each successive clad layer.

5. The method of claim 1, the maintaining uniform energy transfer comprising varying focus of the laser to narrower or wider beam with respect to the substrate surface, optical energy transfer based on component surface topology.

6. The method of claim 1, the maintaining uniform energy transfer comprising varying relative movement rate of the substrate and laser beam.

7. The method of claim 1, the maintaining uniform energy transfer comprising varying laser power output.

8. The method of claim 1, the moving step further comprising rastering the laser beam and substrate relative to each other in up to three dimensions.

9. The method of claim 1 the maintaining uniform energy transfer based on component surface topology further comprising monitoring actual energy transfer level in a closed feedback loop and varying energy transfer rate based on the monitored energy transfer level, in order to maintain uniform energy transfer at the selected optical energy transfer level.

* * * * *